(12) United States Patent
Nguyen (10) Patent No.: US 12,486,939 B2
(45) Date of Patent: Dec. 2, 2025

(54) IMAGE FORMING APPARATUS WITH ROTATING OPERATION PANEL

(71) Applicant: KYOCERA Document Solutions Inc., Osaka (JP)

(72) Inventor: Tung Xuan Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/772,278

(22) Filed: Jul. 15, 2024

(65) Prior Publication Data

US 2025/0027598 A1    Jan. 23, 2025

(30) Foreign Application Priority Data

Jul. 18, 2023 (JP) ................................. 2023-116759

(51) Int. Cl.

| | |
|---|---|
| *G03G 21/16* | (2006.01) |
| *B41J 29/00* | (2006.01) |
| *E05D 11/08* | (2006.01) |
| *F16M 11/10* | (2006.01) |
| *G03G 15/00* | (2006.01) |

(52) U.S. Cl.
CPC .............. *F16M 11/10* (2013.01); *B41J 29/00* (2013.01); *G03G 15/5016* (2013.01); *G03G 21/1647* (2013.01); *E05D 11/084* (2013.01); *E05D 11/087* (2013.01)

(58) Field of Classification Search
CPC ..... E05D 11/084; E05D 11/087; F16M 11/10; B41J 29/00; G03G 15/5016; G03G 21/1647

USPC .......... 16/337, 342; 248/565, 576, 577, 579, 248/582, 587, 590, 74.1, 284.1, 291.1, 248/292, 11, 292.13, 122.1, 123.11, 248/123.2, 125.9
See application file for complete search history.

(56) References Cited

U.S. PATENT DOCUMENTS

| | | | | |
|---|---|---|---|---|
| 3,459,462 A | * | 8/1969 | Barnard | A47L 15/4261 16/374 |
| 5,037,231 A | * | 8/1991 | Kitamura | F16C 11/10 403/111 |
| 7,913,357 B2 | * | 3/2011 | Peng | F16C 11/103 16/297 |

(Continued)

FOREIGN PATENT DOCUMENTS

JP      2020034011 A      3/2020

*Primary Examiner* — Alfred J Wujciak
(74) *Attorney, Agent, or Firm* — IP Business Solutions, LLC.

(57) ABSTRACT

A locking mechanism of an image forming apparatus includes a cap that is rotatable integrally with an operation panel, a rotating member on which the cap is rotatably supported, a fixed member by which the rotating member is rotatably supported, a first coil spring that connects the rotating member and the cap, and a second coil spring that connects the rotating member and the fixed member and has a winding direction opposite to that of the first coil spring, in which, when a force is applied to the operation panel in one direction, a force is applied to the first coil spring in a loosening direction via the cap to allow the operation panel to rotate, and when a force is applied to the operation panel in another direction, a force is applied to the second coil spring in a loosening direction to allow the operation panel to rotate.

3 Claims, 10 Drawing Sheets

(56) References Cited

U.S. PATENT DOCUMENTS

2017/0298982 A1\* 10/2017 Chu .................. F16M 11/10
2020/0063790 A1    2/2020 Kawabata et al.
2020/0318407 A1\* 10/2020 Meyers ............... G06F 1/1681

\* cited by examiner

IMAGE FORMING APPARATUS WITH ROTATING OPERATION PANEL

INCORPORATION BY REFERENCE

This application claims priority to Japanese Patent Application No. 2023-116759 filed on Jul. 18, 2023, the entire contents of which are incorporated by reference herein.

BACKGROUND

The disclosure relates to an image forming apparatus including an operation panel rotatably supported by an apparatus main body.

The main body of the image forming apparatus rotatably supports an operation panel through which various operations associated with image forming operations can be manually input. The operation panel is maintained in a predetermined initial posture and cannot be rotated from the initial posture unless a certain load is applied.

There is an image forming apparatus in which a washer is disposed between a screw member provided coaxially with a rotating shaft and a fixed member fixed to an operation panel. Thereby, a frictional force is generated between the screw member and the fixed member, and the rotation of the fixed member is braked by this frictional force, making it possible to stop the operation panel at any angle. There is also a configuration in which a gear part provided in an operation panel, a gear that is provided in an apparatus main body and engages with the gear part, and a biasing member that biases the gear in the axial direction of a rotating shaft are provided, a frictional force is generated between the gear and the apparatus main body when the gear is biased by the biasing member, and the rotation of the gear is braked by this frictional force to brake the rotation of the gear part, that is, the operation panel.

SUMMARY

As one aspect of the disclosure, technology obtained by further improving the above-described technology is proposed.

An image forming apparatus according to an aspect of the disclosure includes a locking mechanism. The locking mechanism maintains an operation panel, which is rotatably supported by an apparatus main body, in its initial posture. The locking mechanism includes a cap, a rotating member, a fixed member, a first coil spring, and a second coil spring. The cap is rotatable integrally with the operation panel. The cap is rotatably supported by the rotating member. The fixed member is fixed to the apparatus main body with the rotating member being rotatably supported by the fixed member. The first coil spring is externally fitted to the rotating member to connect the rotating member and the cap. The second coil spring connects the rotating member and the fixed member and has a winding direction opposite to that of the first coil spring. When a force is applied to the operation panel in one direction, a force is applied to the first coil spring in a loosening direction via the cap, and the first coil spring is elastically deformed to allow the operation panel to rotate integrally with the cap, and when the force is released, the first coil spring is elastically returned to allow the operation panel to return to its initial posture. When a force is applied to the operation panel in another direction opposite to the one direction, a force is applied to the second coil spring in a loosening direction via the cap and the rotating member, and the second coil spring is elastically deformed to allow the operation panel to rotate integrally with the cap and the rotating member, and when the force is released, the second coil spring is elastically returned to allow the operation panel to return to its initial posture.

DETAILED DESCRIPTION

An image forming apparatus according to an embodiment of the disclosure will be described below with reference to the drawings.

Figure 1:
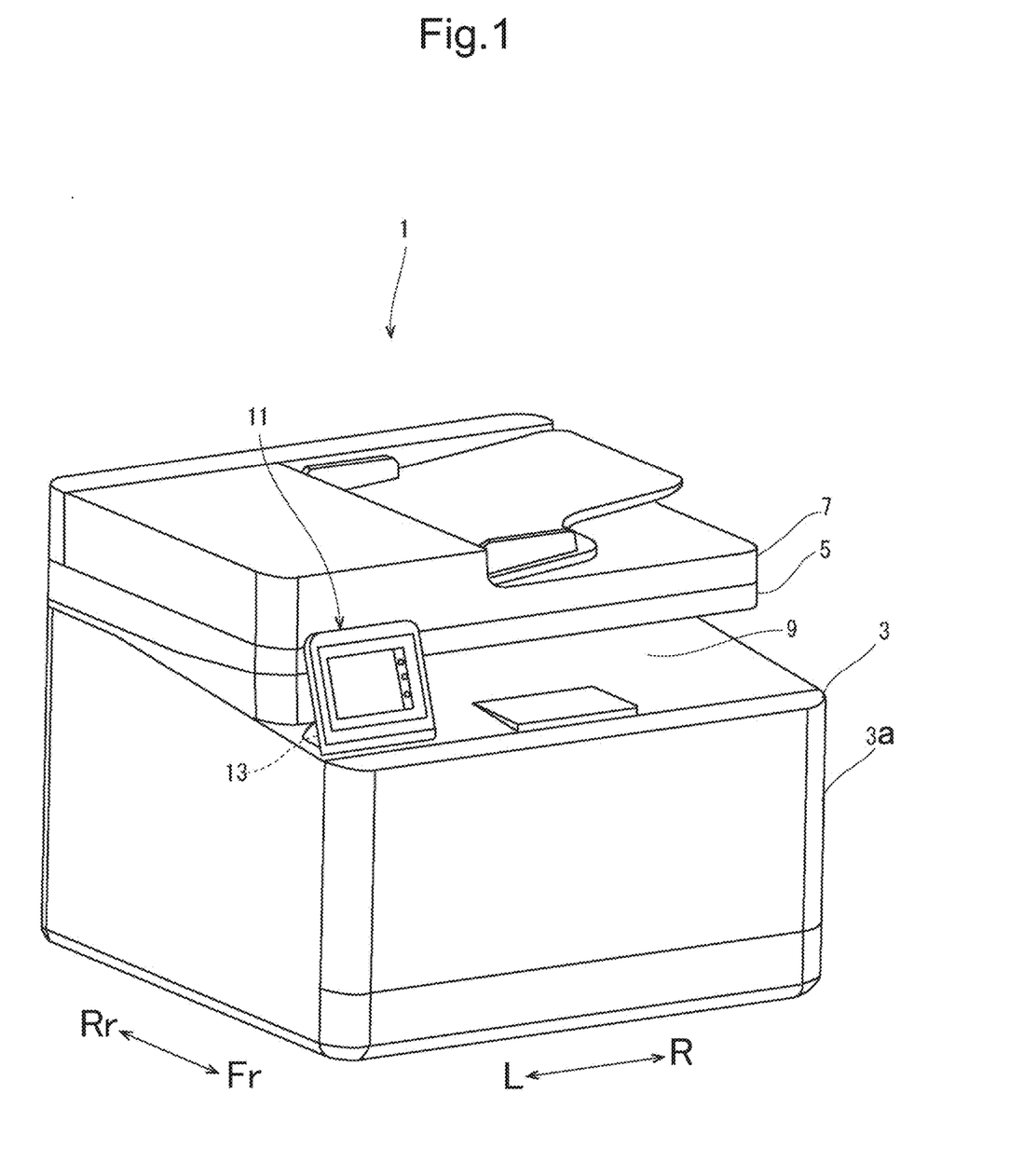
FIG. 1 is a perspective view schematically showing an image forming apparatus according to an embodiment of the disclosure.

First, an overall configuration of an image forming apparatus 1 will be described with reference to FIG. 1. FIG. 1 is a front view showing the image forming apparatus 1. Fr, Rr, L, and R shown in each drawing indicate the forward side, the rearward side, the left side, and the right side of the image forming apparatus 1, respectively. Further, in this embodiment, the terms "front side", "back side", "left side", and "right side" are merely illustrative of directions in a configuration shown in each drawing.

The image forming apparatus 1 includes an image forming unit 3, a document reading unit 5 disposed above the image forming unit 3, and a document conveyance unit 7 disposed above the document reading unit 5. An in-body paper discharge space 9 is formed between the image forming unit 3 and the document reading unit 5. The depth (length in the front-back direction) of the image forming unit 3 is longer than the depths of the document reading unit 5 and the document conveyance unit 7.

An operation panel 11 is supported on the upper surface of an apparatus main body 3a of the image forming unit 3 in front of the in-body paper discharge space 9 via a locking mechanism 13.

Figure 2:
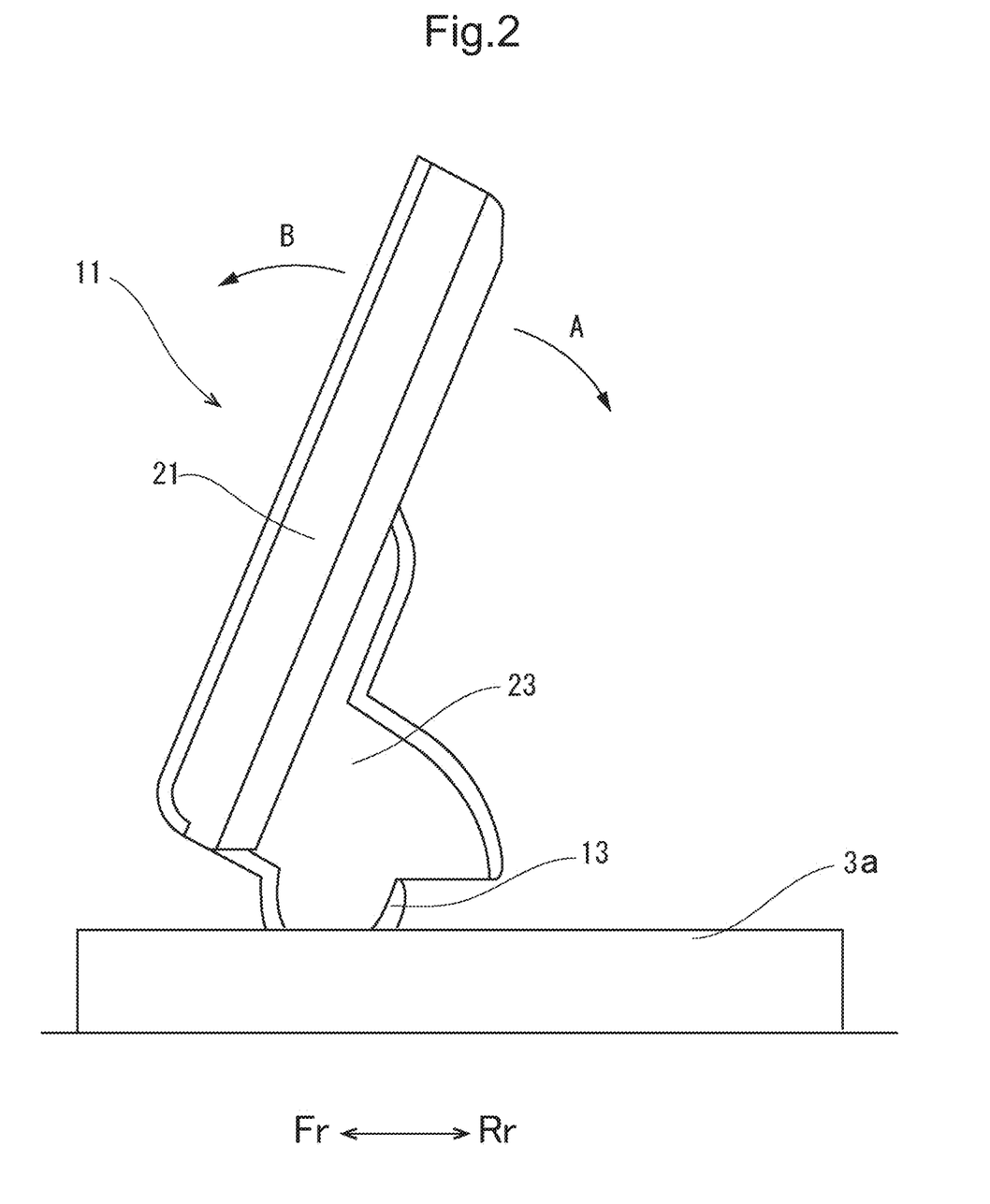
FIG. 2 is a side view showing an operation panel in the image forming apparatus according to the embodiment of the disclosure.
Figure 3A:
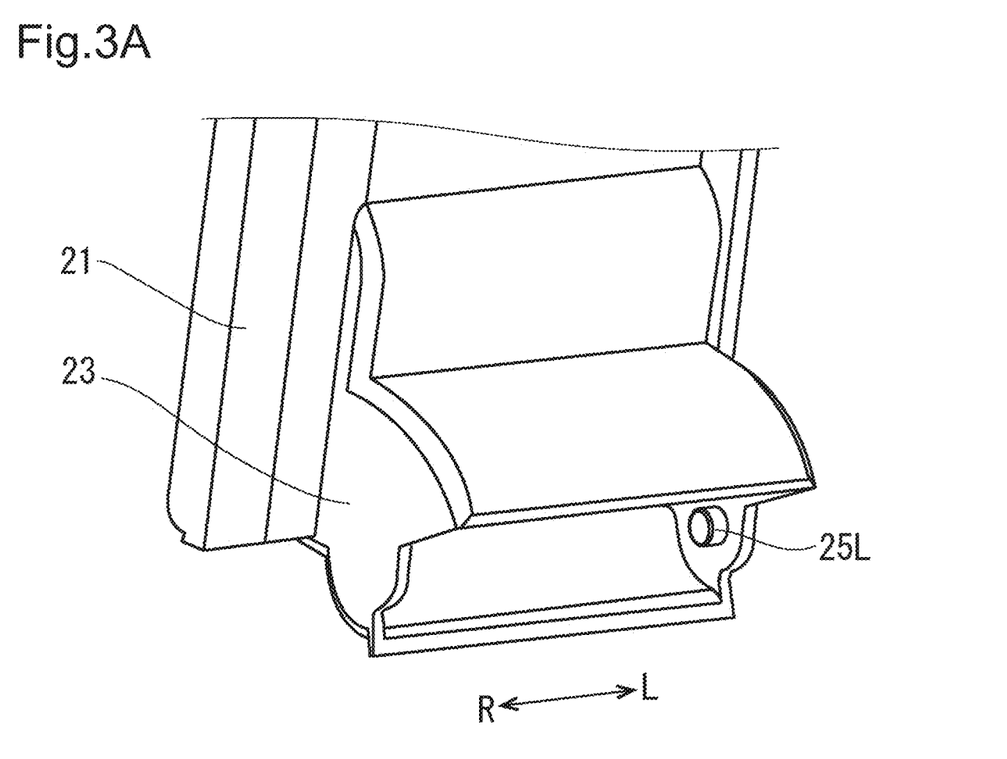
FIG. 3A is a perspective view showing a left rotation axis of the operation panel in the image forming apparatus according to the embodiment of the disclosure.
Figure 3B:
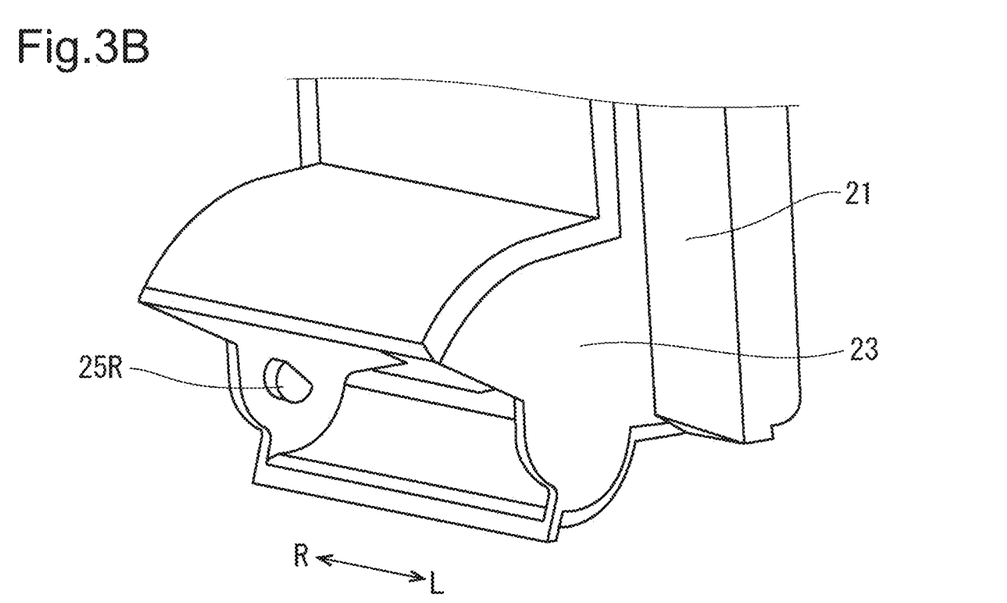
FIG. 3B is a perspective view showing a right rotation axis of the operation panel in the image forming apparatus according to the embodiment of the disclosure.

Next, the operation panel 11 will be described with reference to FIG. 2 and FIGS. 3A and 3B. FIG. 2 is a side view showing the operation panel 11, and FIGS. 3A and 3B are perspective views showing inner surfaces of left and right side walls of a leg part 23 of the operation panel 11. The operation panel 11 includes a main body part 21 provided with a display, a touch panel capable of inputting various operations associated with image forming operations, buttons, and the like and the leg part 23 provided at a lower part of the main body part 21. The leg part 23 has a substantially semi-cylindrical hollow shape, has front and back side walls and left and right side walls, and has an open bottom surface.

As shown in FIGS. 3A and 3B, right and left rotating shafts 25R and 25L are formed coaxially in the right-left direction on the inner surfaces of the right and left side walls. As shown in FIG. 3A, the left rotating shaft 25L has a cylindrical shape. As shown in FIG. 3B, the right rotating shaft 25R has a D-shaped cross section.

Figure 4:
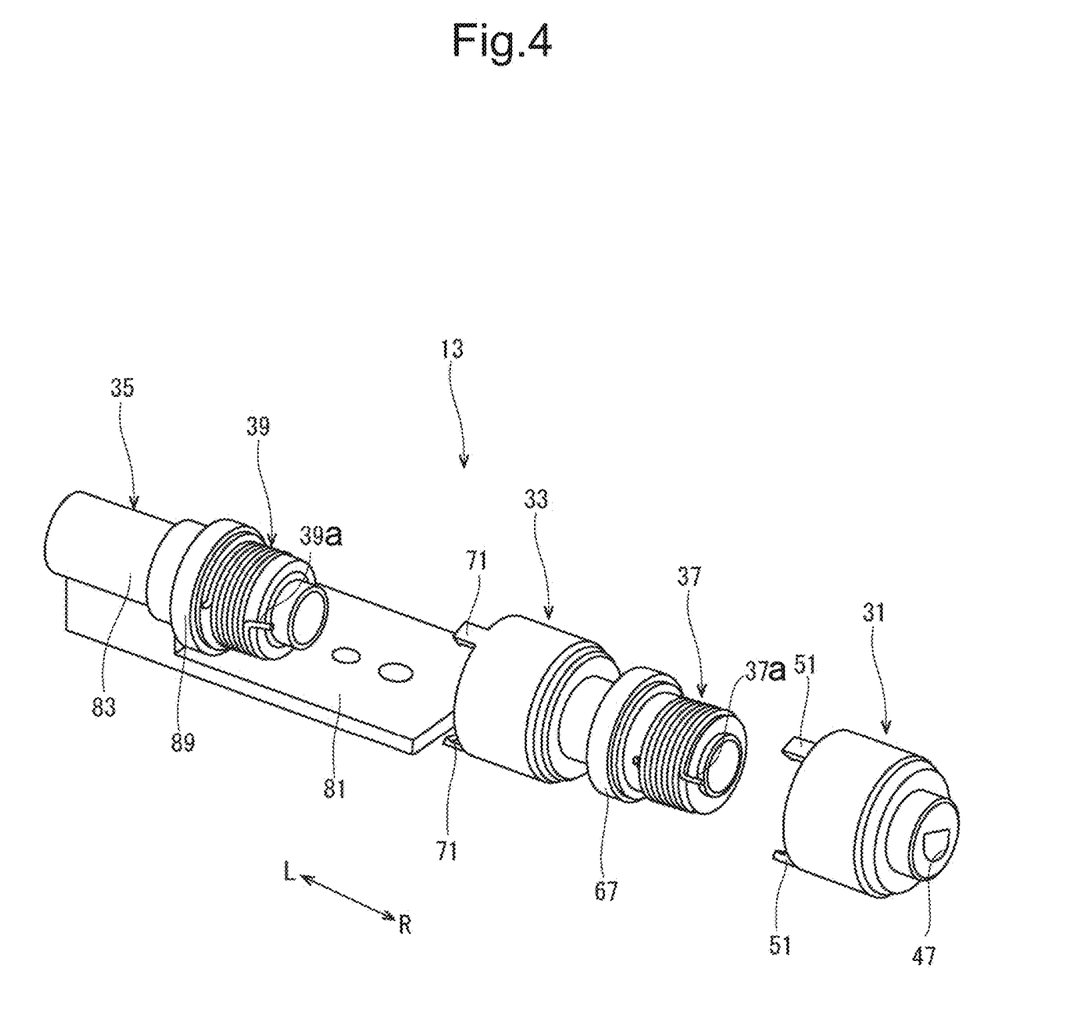
FIG. 4 is an exploded perspective view showing a locking mechanism in the image forming apparatus according to the embodiment of the disclosure.
Figure 5:
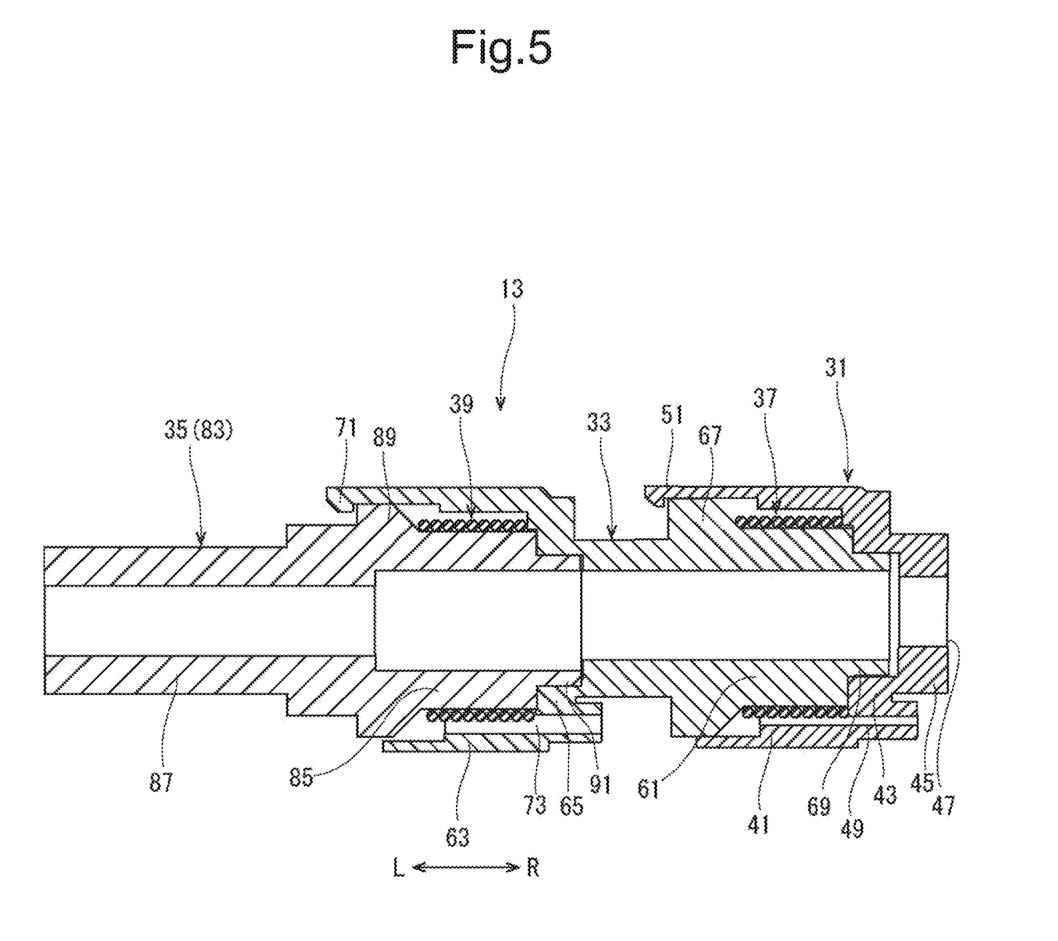
FIG. 5 is a cross-sectional view of the locking mechanism in the image forming apparatus according to the embodiment of the disclosure.

Next, the locking mechanism 13 will be described with reference to FIGS. 4 and 5. FIG. 4 is an exploded perspective view showing the locking mechanism 13, and FIG. 5 is a cross-sectional view of the locking mechanism 13. The locking mechanism 13 includes a cap 31 that rotates integrally with the operation panel 11, a rotating member 33 by which the cap 31 is rotatably supported, a fixed member 35 by which the rotating member 33 is rotatably supported and which is fixed to the apparatus main body 3a, a first coil spring 37 that connects the cap 31 and the rotating member 33, and a second coil spring 39 that connects the rotating member 33 and the fixed member 35.

Figure 6A:
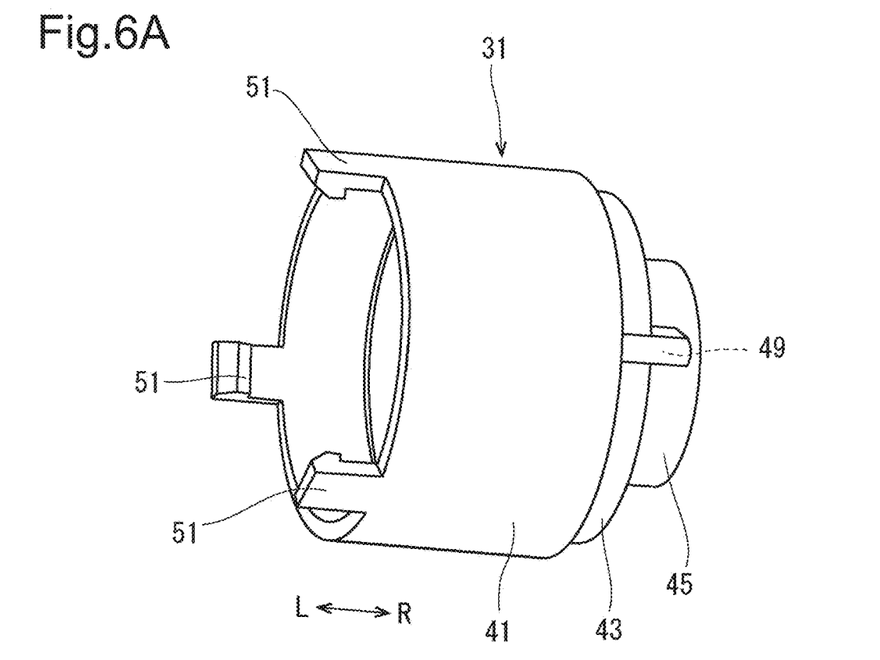
FIG. 6A is a perspective view showing a cap of the locking mechanism in the image forming apparatus according to the embodiment of the disclosure.
Figure 6B:
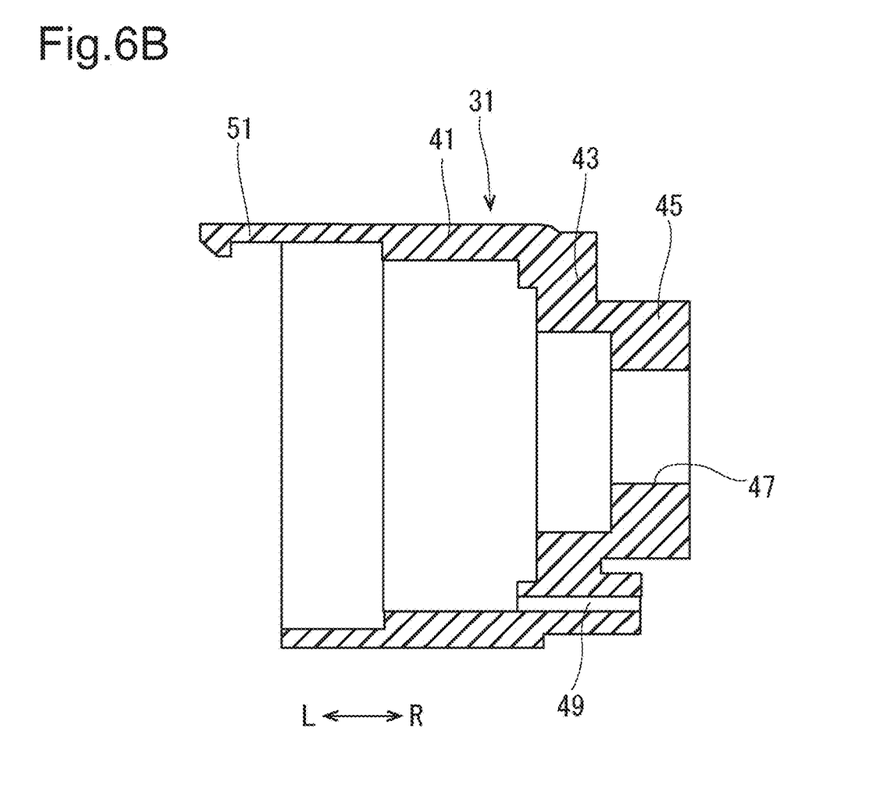
FIG. 6B is a cross-sectional view of the cap of the locking mechanism in the image forming apparatus according to the embodiment of the disclosure.

First, the cap 31 will be described with reference to FIGS. 4 and 5, and FIGS. 6A and 6B. FIG. 6A is a perspective view of the cap 31, and FIG. 6B is a cross-sectional view of the cap 31. As shown in FIGS. 6A and 6B, the cap 31 is a bottomed cylindrical member that includes a cylindrical part 41 and an annular part 43 that are coaxially provided.

A protrusion 45 is formed on the outer surface of the annular part 43. In the protrusion 45, a shaft hole 47 having a D-shape in a cross-sectional view is formed coaxially with the cylindrical part 41. Furthermore, a through hole 49 is formed in the annular part 43 in the axial direction of the cylindrical part 41. Three hook pieces 51 are formed on the edge of the cylindrical part 41 at equal intervals in the circumferential direction. Each of the hook pieces 51 is deformable in the radial direction of the cylindrical part 41, and has an inward (direction toward a radial center portion of the cylindrical part 41) hook formed at its tip.

Figure 7A:
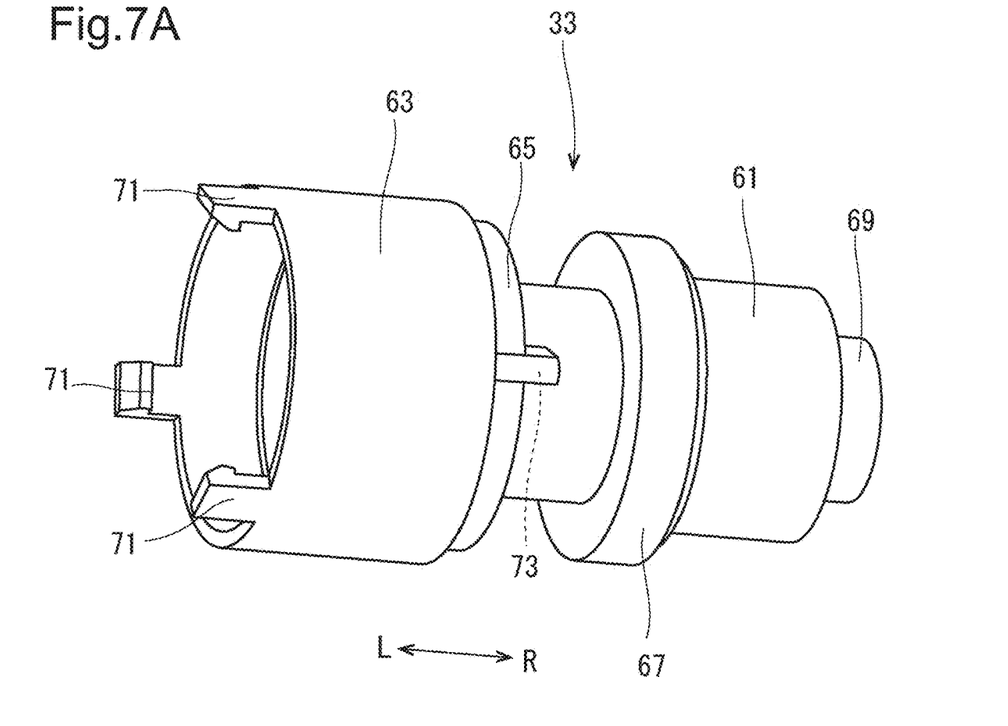
FIG. 7A is a perspective view showing a rotating member of the locking mechanism in the image forming apparatus according to the embodiment of the disclosure.
Figure 7B:
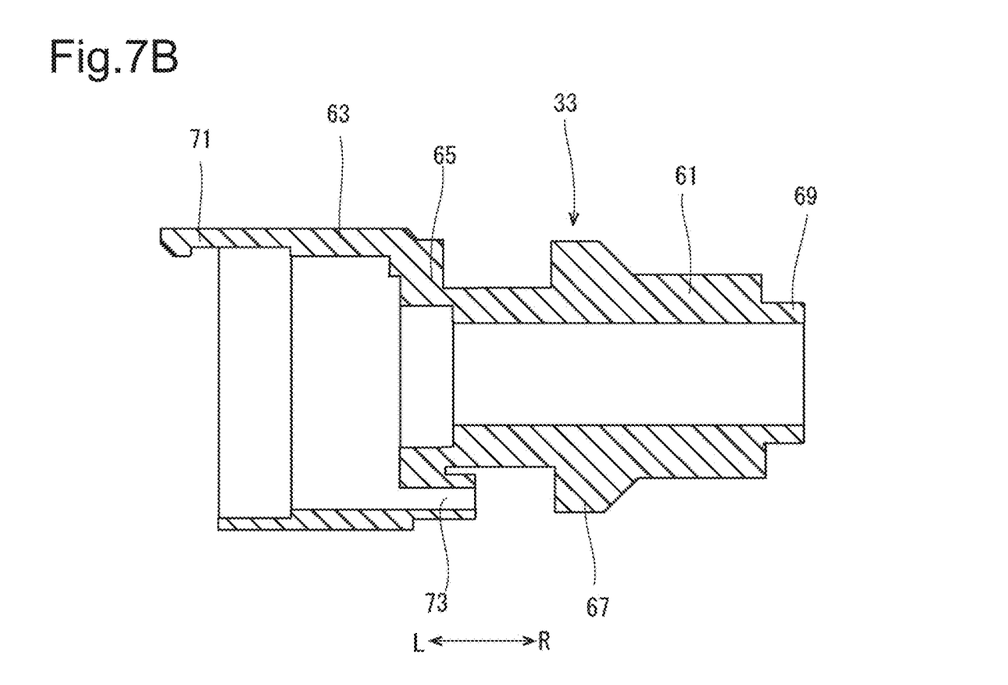
FIG. 7B is a cross-sectional view of the rotating member of the locking mechanism in the image forming apparatus according to the embodiment of the disclosure.

Next, the rotating member 33 will be described with reference to FIGS. 4 and 5 and FIGS. 7A and 7B. FIG. 7A is a perspective view showing the rotating member 33, and FIG. 7B is a cross-sectional view of the rotating member 33. The rotating member 33 is a cylindrical member including a small diameter cylindrical part 61 and a large diameter cylindrical part 63 provided coaxially, and an annular part 65 between the small diameter cylindrical part 61 and the large diameter cylindrical part 63.

The small diameter cylindrical part 61 has a uniform inner diameter. A flange part 67 that protrudes outward in the circumferential direction is formed at substantially the center of the small diameter cylindrical part 61 in the axial direction. The end face of the flange part 67 on the tip side is inclined toward the outside of the small diameter cylindrical part 61 in the radial direction. Further, a protrusion 69 having an outer diameter smaller than that of the small diameter cylindrical part 61 is formed at the tip of the small diameter cylindrical part 61 in the longitudinal direction of the rotating member 33. The large diameter cylindrical part 63 has an inner diameter larger than that of the small diameter cylindrical part 61. Three hook pieces 71 are formed on the edge of the large diameter cylindrical part 63 at equal intervals in the circumferential direction. Each of the hook pieces 71 is elastically deformable in the radial direction of the large diameter cylindrical part 63, and has an inward hook formed at its tip. The inner diameter of the annular part 65 is larger than the inner diameter of the small diameter cylindrical part 61 and smaller than the inner diameter of the large diameter cylindrical part 63. A through hole 73 is formed in the annular part 65 along the axis.

Figure 8A:
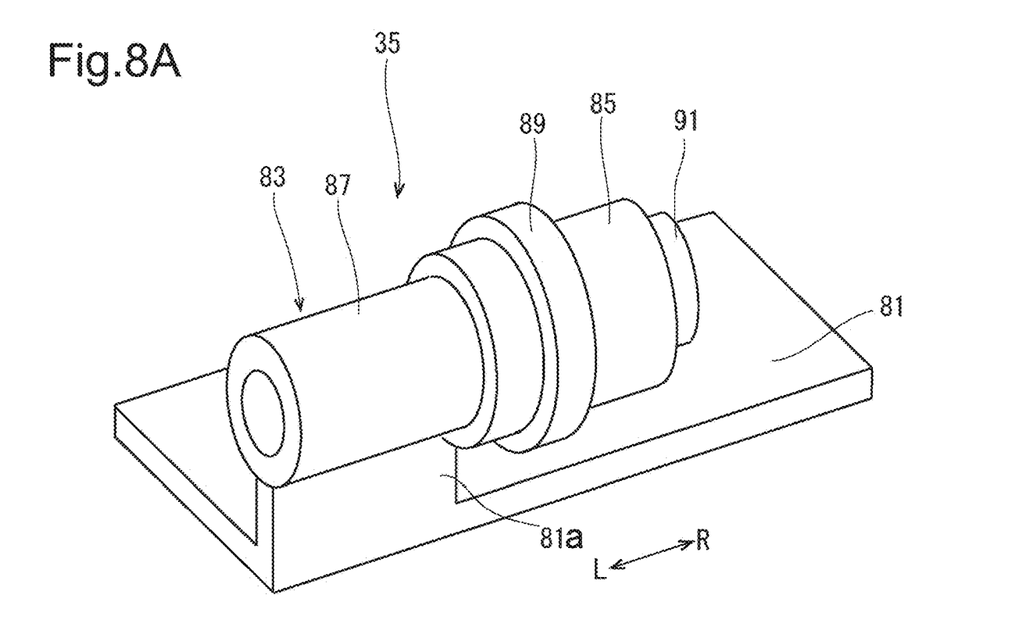
FIG. 8A is a perspective view showing a fixed member of the locking mechanism in the image forming apparatus according to the embodiment of the disclosure.
Figure 8B:
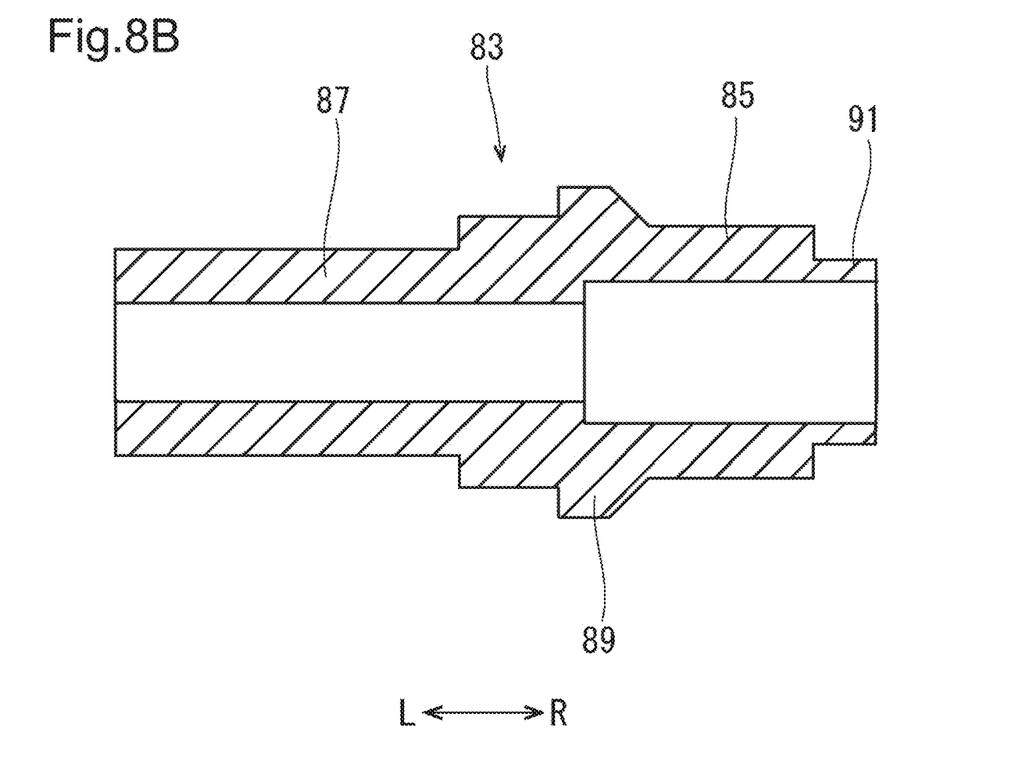
FIG. 8B is a cross-sectional view of the fixed member (hinge part) of the locking mechanism in the image forming apparatus according to the embodiment of the disclosure.

Next, the fixed member 35 will be described with reference to FIGS. 4 and 5 and FIGS. 8A and 8B. FIG. 8A is a perspective view showing the fixed member 35, and FIG. 8B is a cross-sectional view of a hinge part 83 of the fixed member 35. As shown in FIG. 8A, the fixed member 35 includes a fixed plate 81 fixed to the upper surface of the apparatus main body 3a and having a rectangular shape in a plan view, and the cylindrical hinge part 83 supported by the fixed plate 81. The hinge part 83 is supported by a leg part 81a formed along one long side of the fixed plate 81.

The hinge part 83 includes a large diameter cylindrical part 85 and a small diameter cylindrical part 87 that are coaxially provided. A flange part 89 that protrudes outward in the circumferential direction is formed at substantially the center of the large diameter cylindrical part 85 in the axial direction. An end face of the flange part 89 on the tip side is inclined toward the outside of the large diameter cylindrical part 85 in the radial direction. Further, a protrusion 91 having an outer diameter smaller than that of the large diameter cylindrical part 85 is formed at the tip of the large diameter cylindrical part 85. The small diameter cylindrical part 87 is fixed to the leg part 81a of the fixed plate 81.

Next, the first coil spring 37 and the second coil spring 39 will be described with reference to FIG. 4. The winding direction of the first coil spring 37 is a clockwise direction when viewed from the right side. One end 37a of the first coil spring 37 is bent in the axial direction of the first coil spring 37. The winding direction of the second coil spring 39 is opposite to the winding direction of the first coil spring 37 and is a counterclockwise direction when viewed from the right side. One end 39a of the second coil spring 39 is bent in the axial direction of the second coil spring 39.

Next, an example of a method of assembling the cap 31, the rotating member 33, the fixed member 35, the first coil spring 37, and the second coil spring 39 will be described mainly with reference to FIG. 5. First, the second coil spring 39 is externally fitted to the large diameter cylindrical part 85 of the hinge part 83 of the fixed member 35 from the tip side thereof. Then, the other end of the second coil spring 39 (an end opposite to the one end 39a to be described later) is fixed to the flange part 89 of the large diameter cylindrical part 85. On the other hand, the first coil spring 37 is externally fitted to the small diameter cylindrical part 61 of the rotating member 33 from the tip side thereof. Then, the other end of the first coil spring 37 (an end opposite to one end 37a to be described later) is fixed to the flange part 67 of the small diameter cylindrical part 61. The inner diameters of the first coil spring 37 and the second coil spring 39 are slightly smaller than the outer diameters of the small diameter cylindrical part 61 and the large diameter cylindrical part 85 to which they are externally fitted, respectively, in a natural state where no external force is applied. At the time of externally fitting the coil springs, both ends thereof are slightly twisted in a direction opposite to the winding direction to widen the inner diameters and insert the small diameter cylindrical part 61 and the large diameter cylindrical part 85 into the diameter cylindrical parts. In the externally fitted state, the first coil spring 37 and the second coil spring 39 tighten the small diameter cylindrical part 61 and the large diameter cylindrical part 85 with their elastic forces.

Next, the rotating member 33 is connected to the fixed member 35 (hinge part 83). In detail, the large diameter cylindrical part 63 of the rotating member 33 is fitted into the large diameter cylindrical part 85 of the hinge part 83. At this time, one end 39a of the second coil spring 39 externally fitted to the large diameter cylindrical part 85 of the fixed member 35 is inserted into the through hole 73 formed in the annular part 65 of the rotating member 33. Thereby, the fixed member 35 and the rotating member 33 are connected by the second coil spring 39. Further, the protrusion 91 (see FIGS. 8A and 8B) of the large diameter cylindrical part 85 of the hinge part 83 is fitted into the annular part 65 (see FIGS. 7A and 7B) of the rotating member 33. Further, the three hook pieces 71 of the rotating member 33 are locked to the flange part 89 of the hinge part 83 of the fixed member 35. At this time, each of the hook pieces 71 is guided along the inclined side surface of the flange part 89 and is elastically deformed outward in the radial direction, and when the hook is separated from the flange part 89, the hook piece 71 is elastically returned and the hook is locked to the flange part 89. Thereby, the rotating member 33 is prevented from coming off by the fixed member 35 and is rotatable with respect to the fixed member 35.

Next, the cap 31 is connected to the rotating member 33. Specifically, the cap 31 is covered over the small diameter cylindrical part 61 of the rotating member 33. At this time, one end 37a of the first coil spring 37 externally fitted to the small diameter cylindrical part 61 of the rotating member 33 is inserted into the through hole 49 formed in the annular part 43 of the cap 31. Thereby, the rotating member 33 and the cap 31 are connected by the first coil spring 37. Further, the protrusion 69 of the small diameter cylindrical part 61 of the rotating member 33 is fitted into the annular part 43 of the cap 31. Furthermore, the three hook pieces 51 of the cap 31 are locked to the flange part 67 of the rotating member 33. At this time, each of the hook pieces 51 is guided along the inclined side surface of the flange part 67 and is elastically deformed outward in the radial direction, and when the hook is separated from the flange part 67, the hook piece 51 is elastically returned and the hook is locked to the flange part 67. Thereby, the cap 31 is prevented from coming off by the rotating member 33 and is rotatable with respect to the rotating member 33. In this manner, the cap 31, the rotating member 33, the fixed member 35, the first coil spring 37, and the second coil spring 39 are assembled to constitute the locking mechanism 13.

Figure 9:
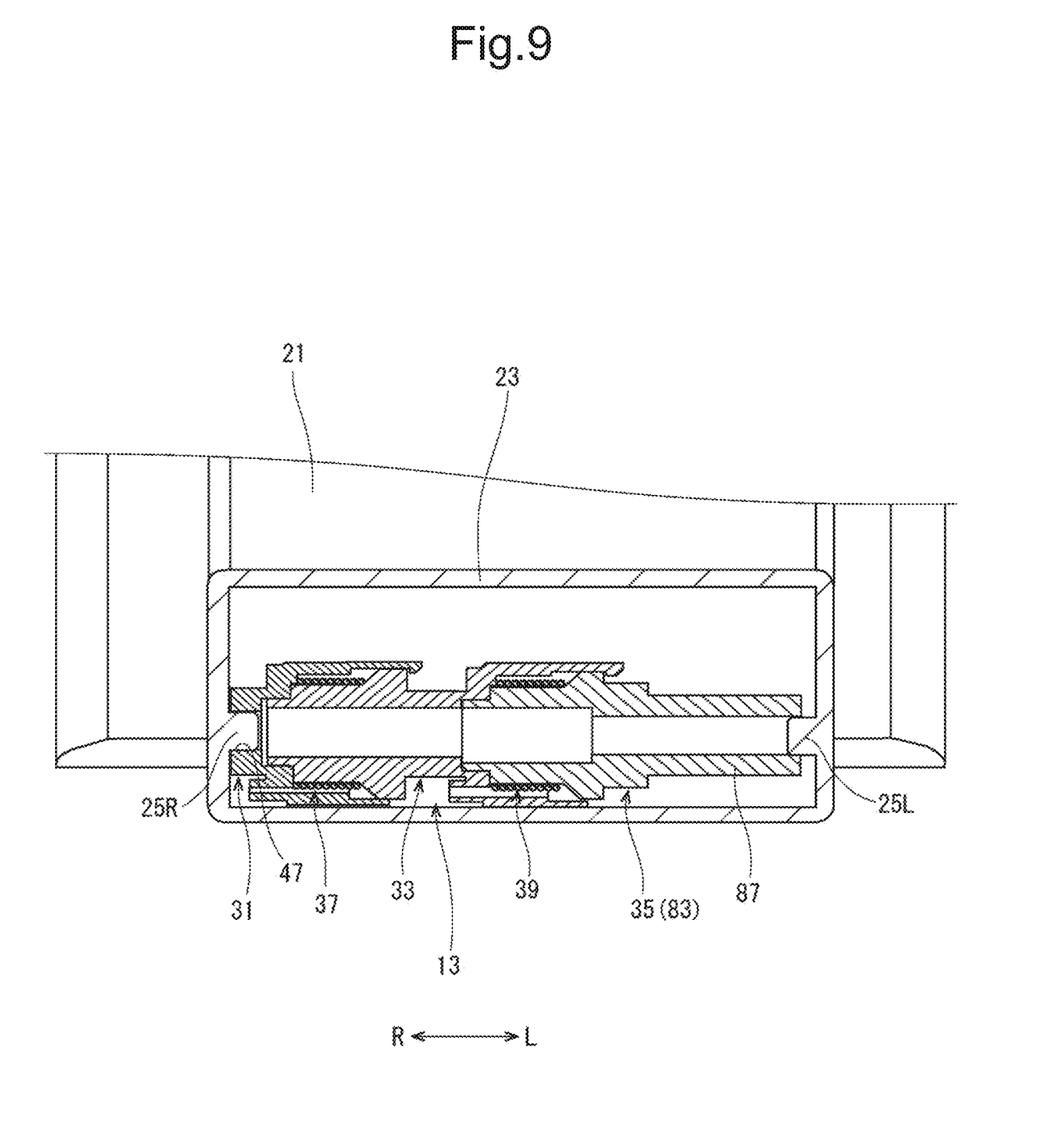
FIG. 9 is a cross-sectional view of the operation panel supported by the locking mechanism in the image forming apparatus according to the embodiment of the disclosure.

Next, the operation panel 11 supported by the locking mechanism 13 will be described with reference to FIG. 9. FIG. 9 is a cross-sectional view of the operation panel 11 supported by the locking mechanism 13 when viewed from behind. The locking mechanism 13 is disposed with the cap 31 facing to the right when viewed from the front side of the image forming apparatus 1, and the fixed plate 81 of the fixed member 35 is fixed to the upper surface of the apparatus main body 3a of the image forming unit 3.

The left rotating shaft 25L formed on the left side wall of the leg part 23 of the operation panel 11 is inserted into the small diameter cylindrical part 87 of the hinge part 83 of the fixed member 35. Further, the right rotating shaft 25R formed on the right side wall is inserted into the shaft hole 47 of the cap 31. Thereby, the operation panel 11 is rotatable around the rotating shafts 25L and 25R. Further, since the right rotating shaft 25R and the shaft hole 47 have a D-shaped cross section, the cap 31 can rotate integrally with the operation panel 11. At this time, the orientations (the orientations of a letter D) of the right rotating shaft 25R and the shaft hole 47 are set such that the operation panel 11 is inclined at a predetermined angle (for example, an angle at which the operation panel 11 takes the posture shown in FIG. 2) with respect to the upper surface of the apparatus main body 3a.

Although a force due to the weight of the operation panel 11 is applied to the first coil spring 37 and the second coil spring 39, spring forces of both the springs 37 and 39 are set to be larger than the force, and both the springs 37 and 39 are not elastically deformed by the weight of the operation panel 11. Thus, the rotation of the rotating member 33 with respect to the fixed member 35 is regulated by the second coil spring 39, and the rotation of the cap 31 with respect to the rotating member 33 is regulated by the first coil spring 37. As a result, the operation panel 11 is maintained in the initial posture (see FIG. 2) inclined at the predetermined angle with respect to the upper surface of the apparatus main body 3a. As an example, when the force applied to the operation panel 11 is 10 N or less, the spring forces of both the springs 37 and 39 are set such that the operation panel 11 is not rotated but is maintained in its initial posture.

The operation of the locking mechanism 13 having the above-described configuration will be described with reference to FIGS. 2, 4, and 9, and the like. FIG. 9 is a perspective view showing the first coil spring 37 and the second coil spring 39. When a force is applied to the operation panel 11 in a backward direction (see an arrow A in FIG. 2, a clockwise direction when the operation panel 11 is viewed from the right side) due to a user's hand or a document being touched, the operation panel 11 is maintained in its initial posture by both the springs 37 and 39 and is not rotated when a force is 10 N or less as described above. However, when a force applied to the operation panel 11 is 10 N or greater, a force is also applied to the cap 31, which rotates integrally with the operation panel 11, in a backward direction (clockwise direction in FIG. 4). Then, one end 37a of the first coil spring 37 fixed to the cap 31 moves clockwise (see an arrow A1 in FIG. 10), and the first coil spring 37 is elastically deformed to loosen. As a result, the first coil spring 37 slides against the small diameter cylindrical part 61 of the rotating member 33, the cap 31 rotates clockwise, and the operation panel 11 can be rotated backward.

When the force applied to the operation panel 11 is released, the force applied to the cap 31 is also released, and the first coil spring 37 is elastically returned. As a result, the cap 31 rotates counterclockwise, and the operation panel 11 rotates forward to return to its initial posture.

On the other hand, even when a forward force is applied to the operation panel 11 (see an arrow B in FIG. 2, a counterclockwise direction when viewed from the right side), the operation panel 11 is maintained in its initial posture by both the springs 37 and 39 when the force is 10

N or less. However, when the force applied to the operation panel 11 is greater than 10 N, a forward force (counterclockwise direction in FIG. 4) is also applied to the cap 31 which rotates integrally with the operation panel 11. Then, one end 37*a* of the first coil spring 37 fixed to the cap 31 moves counterclockwise (see an arrow B1 in FIG. 10), and the first coil spring 37 is elastically deformed to tighten. Thereby, the first coil spring 37 is tightened to the small diameter cylindrical part 61 of the rotating member 33, and the rotating member 33 is rotatably connected integrally with the cap 31 by the first coil spring 37.

Figure 10:
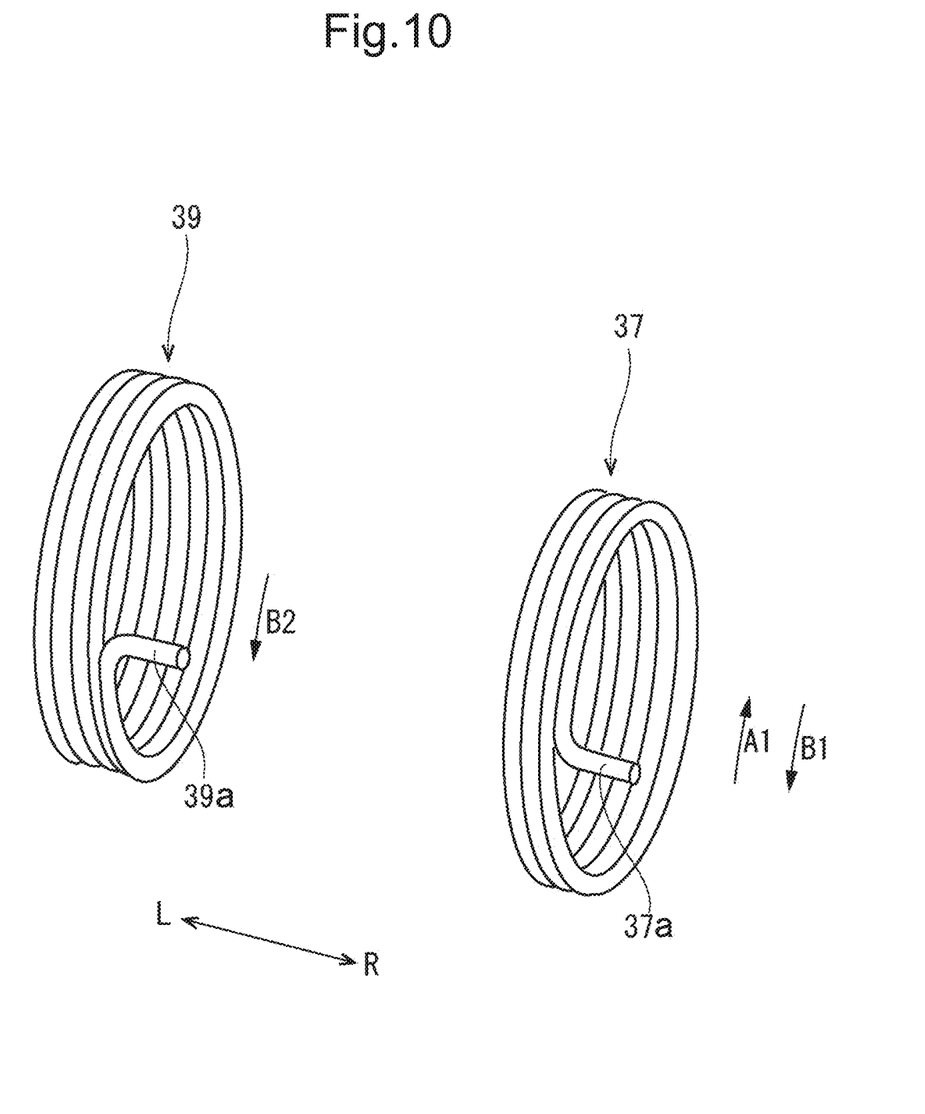
FIG. 10 is a perspective view showing a first coil spring and a second coil spring of the locking mechanism in the image forming apparatus according to the embodiment of the disclosure.

Then, one end 39*a* of the second coil spring 39 fixed to the rotating member 33 moves counterclockwise via the cap 31 and the rotating member 33 (see an arrow B2 in FIG. 10). Then, the second coil spring 39 is elastically deformed to loosen. As a result, the second coil spring 39 slides against the large diameter cylindrical part 85 of the hinge part 83, and the rotating member 33 and the cap 31 rotate counterclockwise, allowing the operation panel 11 to rotate forward.

When the force applied to the operation panel 11 is released, the force applied to the cap 31 is also released, and the second coil spring 39 is elastically returned. As a result, the cap 31 and the rotating member 33 rotate clockwise, and the operation panel 11 rotates backward to return to its initial posture.

As described above, according to the present embodiment, when a backward or forward force is temporarily applied to the operation panel 11, the operation panel 11 rotates, but when the force applied to the operation panel 11 is released, the operation panel 11 returns to its initial posture due to the elastic return forces of the first coil spring 37 and the second coil spring 39. Thus, the operation panel 11 can be reliably maintained in its initial posture.

The operation panel 11 is maintained in its initial posture by a load applied from the first coil spring 37 and the second coil spring 39. The load applied from the coil springs is less likely to fluctuate than a load applied by a frictional force, and it is possible to set a predetermined load depending on the design of the coil springs. In addition, it is also possible to predict changes in the coil springs over time. Thus, the operation panel 11 can be maintained in a constant posture for a long period of time. Furthermore, since the movement of the coil springs during the rotation of the operation panel 11 is stable, the operation panel 11 can be rotated smoothly.

In the image forming apparatus shown in the background, the operation panel is supported in a constant posture by a frictional force generated by the washer and the biasing member. However, the frictional force is unstable and susceptible to fluctuations due to the surrounding environment and changes over time. For this reason, there is a concern that the operation panel cannot be maintained in a constant posture for a long period of time. In contrast, according to the embodiment described above, the operation panel 11 can be reliably maintained in the initial posture.

Although the disclosure has been described with respect to the specific embodiment, the disclosure is not limited to the embodiment described above. The embodiment described above may be variously changed, replaced, and modified without departing from the scope and gist of the disclosure, and the claims include all embodiments that may be included within the scope of the technical idea.

What is claimed is:

1. An image forming apparatus comprising:
   a locking mechanism that maintains an operation panel, which is rotatably supported by an apparatus main body, in its initial posture, wherein
   the locking mechanism includes
   a cap that is rotatable integrally with the operation panel,
   a rotating member on which the cap is rotatably supported,
   a fixed member by which the rotating member is rotatably supported and which is fixed to the apparatus main body,
   a first coil spring that is externally fitted to the rotating member and connects the rotating member and the cap, and
   a second coil spring that connects the rotating member and the fixed member and has a winding direction opposite to that of the first coil spring,
   when a force is applied to the operation panel in one direction, a force is applied to the first coil spring in a loosening direction via the cap, and the first coil spring is elastically deformed to allow the operation panel to rotate integrally with the cap, and when the force is released, the first coil spring is elastically returned to allow the operation panel to return to its initial posture, and
   when a force is applied to the operation panel in another direction opposite to the one direction, a force is applied to the second coil spring in a loosening direction via the cap and the rotating member, and the second coil spring is elastically deformed to allow the operation panel to rotate integrally with the cap and the rotating member, and when the force is released, the second coil spring is elastically returned to allow the operation panel to return to its initial posture.

2. The image forming apparatus according to claim 1, wherein
   when a force is applied to the operation panel in the other direction, a force is applied to the first coil spring in a tightening direction via the cap, the first coil spring is tightened to the rotating member to allow the rotating member to be rotatable integrally with the cap, and a force is applied to the second coil spring in a loosening direction via the cap and the rotating member.

3. The image forming apparatus according to claim 1, wherein
   spring forces of the first coil spring and the second coil spring are set to be larger than a force due to a weight of the operation panel,
   rotation of the rotating member with respect to the fixed member is regulated by the second coil spring, and rotation of the cap with respect to the rotating member is regulated by the first coil spring, and
   the operation panel is maintained in the initial posture, which is inclined at a predetermined angle with respect to an upper surface of the apparatus main body in a state where no force is applied from the outside.

* * * * *